United States Patent
Getfield

(12) 
(10) Patent No.: US 6,591,763 B2
(45) Date of Patent: Jul. 15, 2003

(54) COLLAPSIBLE SEAT BACK TRAY ASSEMBLY

(76) Inventor: Kenneth Getfield, 36 Ivory Rd., Bloomfield, CT (US) 06002

( * ) Notice: Subject to any disclaimer, the term of this patent is extended or adjusted under 35 U.S.C. 154(b) by 0 days.

(21) Appl. No.: 09/970,807

(22) Filed: Oct. 4, 2001

(65) Prior Publication Data

US 2003/0066462 A1 Apr. 10, 2003

(51) Int. Cl.⁷ .............................................. A47B 23/00
(52) U.S. Cl. ...................................................... 108/44
(58) Field of Search ............................ 108/42, 44, 46, 108/47, 134, 135, 152; 224/275; 297/188.04, 188.06, 188.2, 163

(56) References Cited

U.S. PATENT DOCUMENTS

| | | | | |
|---|---|---|---|---|
| 530,349 A | * | 12/1894 | Payne | ........................ 108/135 |
| 2,672,988 A | * | 3/1954 | Johnson | ................... 211/88.01 |
| 3,050,355 A | * | 8/1962 | Hess et al. | ...................... 108/9 |
| 3,268,133 A | * | 8/1966 | Mcanallen | ................... 224/275 |
| 3,386,392 A | * | 6/1968 | Gramm | ........................ 108/44 |
| 3,625,161 A | * | 12/1971 | Rosner | ......................... 108/44 |

* cited by examiner

*Primary Examiner*—Janet M. Wilkens
(74) *Attorney, Agent, or Firm*—Alix, Yale & Ristas, LLP

(57) ABSTRACT

A tray assembly for mounting on the back of a first seat, such as a front seat of a car, that is disposed substantially in front of a second seat, such as a back seat of a car, to permit a user to sit on the second seat and utilize the tray assembly. The tray assembly includes first and second inverted generally U-shaped hooks. Each of the hooks has first and second legs. Each of the first legs extends along a front face of the first seat and each of the second legs extends along the rear face of the seat back of the first seat. First and second laterally spaced cross members extend between the second legs along the rear face of the first seat. A generally rectangular has one side hinged to one of the cross members and first and second oblique supports extending from a slip fit with spaced parts of a second side to a hinged connection at the respective second legs.

8 Claims, 5 Drawing Sheets

COLLAPSIBLE SEAT BACK TRAY ASSEMBLY

BACKGROUND OF THE INVENTION

The invention relates to tray assemblies suitable for a child to use for eating while seated in a back seat of a car.

U.S. Pat. No. 3,625,161 issued on Dec. 7, 1971 describes one such seat back tray assembly. That assembly includes laterally spaced U-shaped inverted hooks with respective depending legs. The U-shaped inverted hooks engage the top of the seat back and the depending legs extend in laterally spaced parallel relationship along the back of the automobile seat. The apparatus includes a telescoping oblique strut to support the tray member. The apparatus disclosed is nominally collapsible, however, the procedure for achieving the collapse of the mechanism can not be achieved rapidly. Thus, the mechanism presents some safety hazard because, in the event of an automobile crash, the passenger located behind the tray assembly is exposed to impact with the tray assembly and potentially serious injury.

SUMMARY OF THE INVENTION

It is an object of the present invention to provide apparatus that will reduce the risks to passengers seated behind such tray assemblies.

Another object of the invention is to provide a tray assembly that will be easy and relatively inexpensive to manufacture.

It has now been found that these and other objects of the invention may be attained in a tray assembly for mounting on an automobile front seat to permit a user to sit on the back seat to safely utilize the tray assembly that includes a slip fit structure that will come apart in response to a forward force. The preferred embodiments include first and second inverted generally U-shaped hooks. Each of the hooks has first and second legs. Each of the first legs extends along a front face of the front seat and each of the second legs extend along the rear face of the front seat. First and second laterally spaced cross members extend between the second legs of the generally U-shaped members along the rear face of the front seat. A generally rectangular tray has one side hinged to one of the cross members. Oblique supports extend from spaced parts of a second side of the generally rectangular tray that is opposed to the one side to the respective second legs of the first and second inverted generally U-shaped members. Slip fit means couple the oblique supports to the second side of the rectangular tray.

In some forms of the invention, the second side of the generally rectangular tray includes eye shaped elements dimensioned and configured for engagement with respective oblique supports. The slip fit means may include the upper axial extremity of each of the oblique supports having a shoulder for cooperation with one of the eye shaped elements and the upper axial extremity of each of the oblique supports may include a rounded surface that is tapered downwardly toward the associated second seat to ensure release upon impact by a forward force in the direction of the associated first seat.

BRIEF DESCRIPTION OF THE DRAWINGS

The invention will be better understood by reference to the company drawing in which.

DESCRIPTION OF THE PREFERRED EMBODIMENTS

Figure 1:
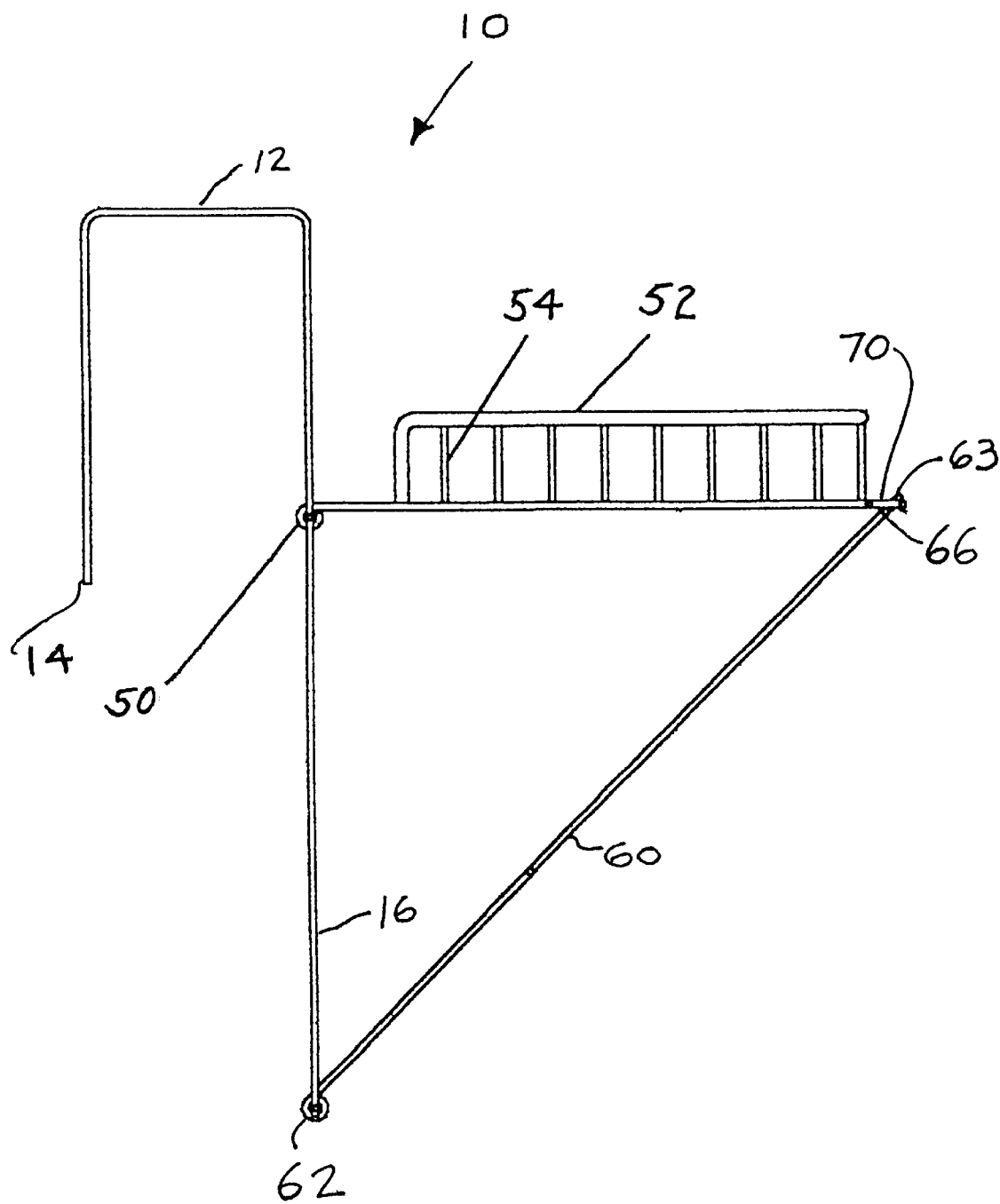
FIG. 1 is a side elevation view of the tray assembly, shown with the tray positioned for use, in accordance with one form of present invention.
Figure 2:
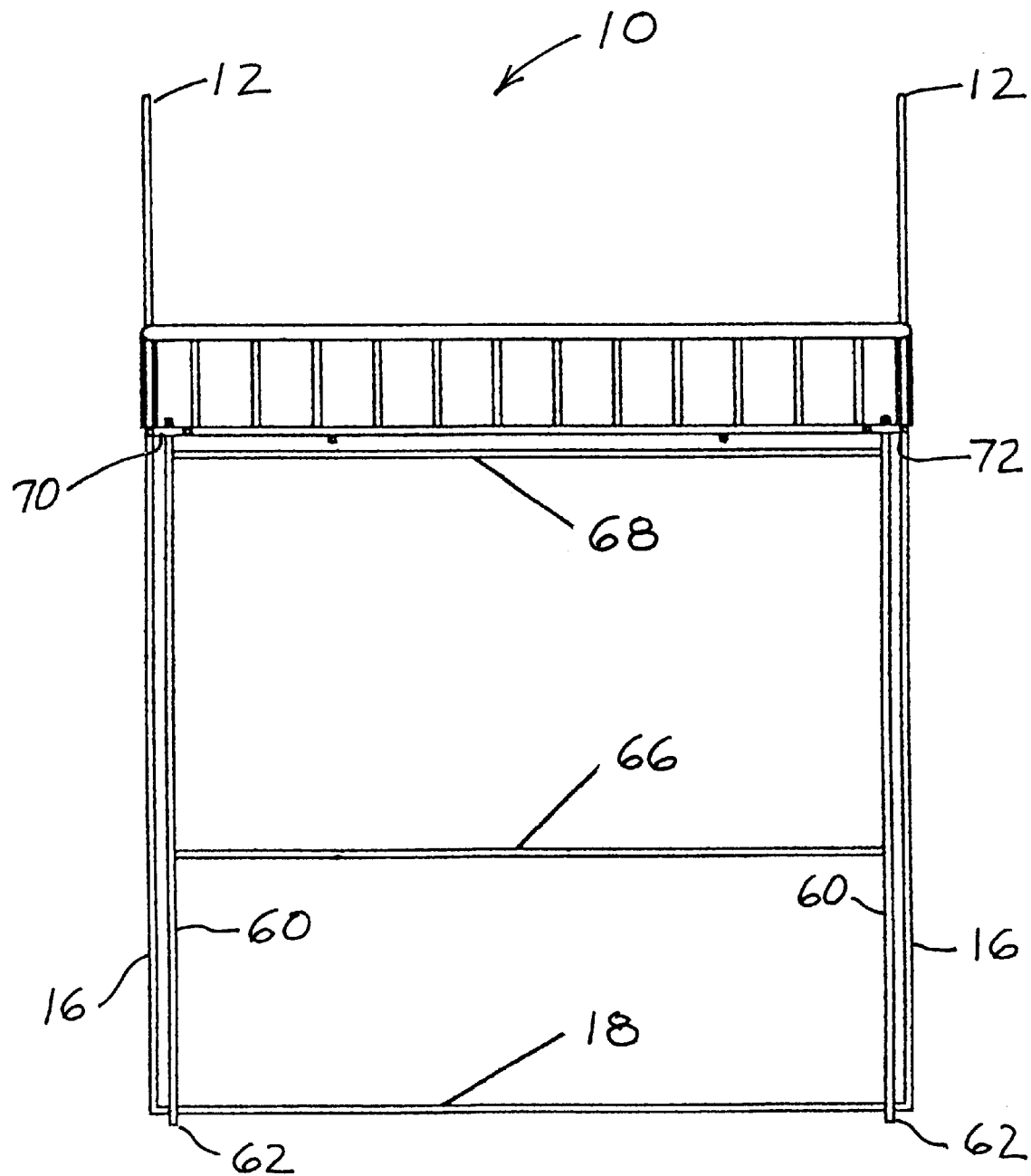
FIG. 2 is a rear elevation view of the tray assembly shown in FIG. 1 with the tray positioned for use.
Figure 3:
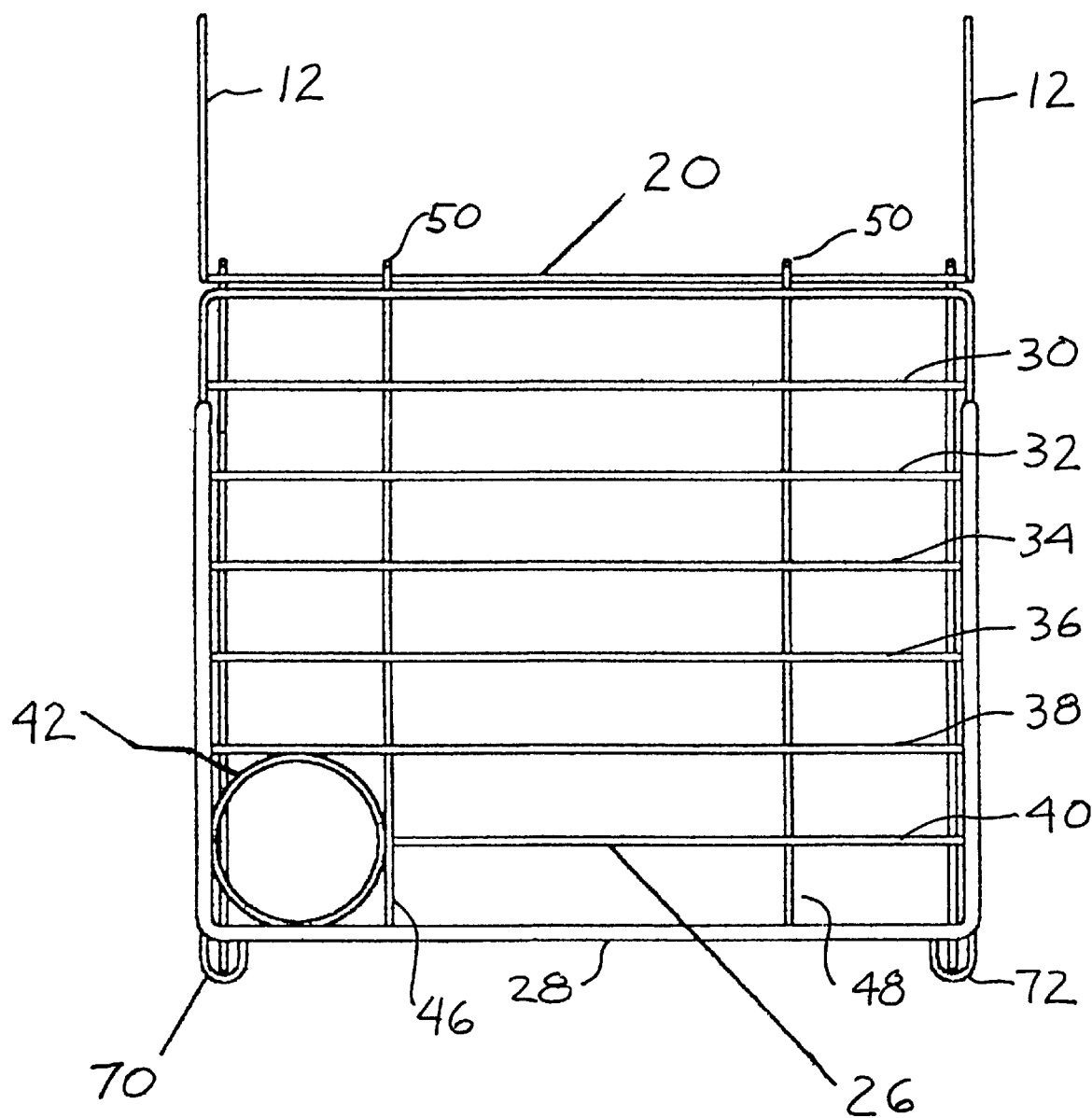
FIG. 3 is a plan view of the tray assembly shown in FIG. 1 with the tray positioned for use.
Figure 4:
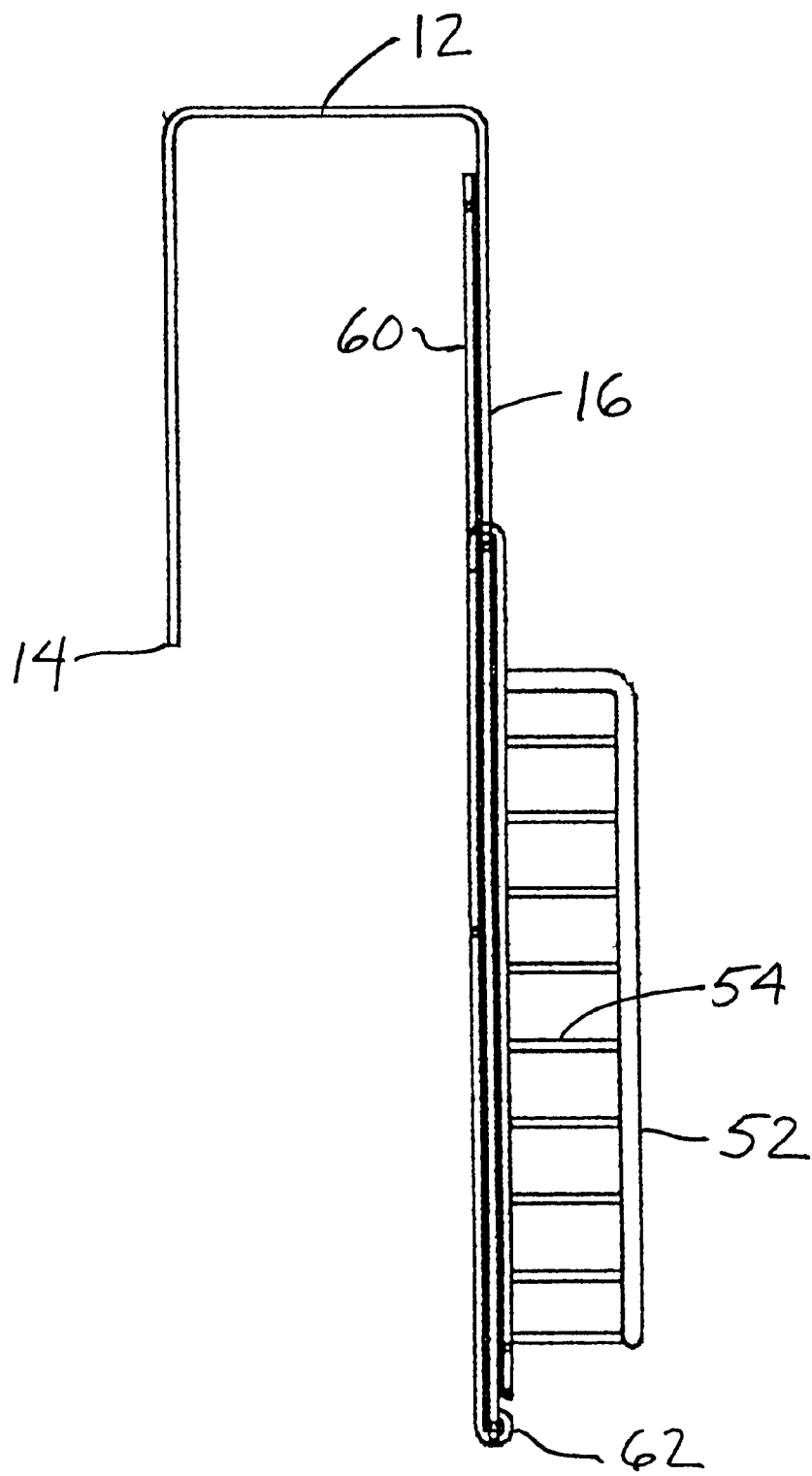
FIG. 4 is a side elevation view of the same apparatus with the tray assembly collapsed to the stored positioned.

Referring now to FIGS. 1–5, there is shown a tray assembly 10 in accordance with one form of the present invention. The apparatus includes two inverted generally U-shaped hooks 12 that are dimensioned and configured for engaging the back of the seat disposed in front of the seat in which the user is sitting. A relatively short leg of the hook 12 extends along the front face of the back of the seat in front of the user. Ordinarily, the tip 14 of each relatively short leg of the inverted generally U-shaped hook 12 is rounded to ensure that the upholstery of the seat on which the apparatus is disposed will not be damaged.

Extending from the other side of each inverted generally U-shaped hook 12 are mutually parallel, relatively longer generally vertical legs 16 that extend along the rear surface of the seat (not shown) that supports the tray assembly 10. Extending laterally and thus generally horizontally between the legs 16 are cross members 18, 20. The cross member 20 is engaged by a tray 26 having a lattice or grid shape. More specifically, the tray 26 includes a generally rectangular frame 28 having mutually parallel spaced laterally extending members 30, 32, 34, 36, 38, and 40 extending between opposed sides of the grid shaped tray 26. A ring 42 that is dimensioned and configured for receiving a beverage cup is supported by the frame 28, a laterally extending member 38 and a support member 46. The support member 46 extends from the lower (as viewed in FIG. 3) side of the frame 28 past the opposite side of the frame 28 with the axial extremity thereof terminates in an eye 50 that encircles the cross member 20. Similarly, a support member 48 extends from the lower, as viewed in FIG. 3) side of the frame 28 past the opposite side of the frame 28 where the axial extremity thereof terminates in an eye 15 that also encircles the cross member 20. It will thus be seen that the respective eyes 15 disposed at the axial extremities of the support member's 46, 48 function as hinge elements to allow pivotal movement of the grid shaped tray 26 between the position shown in FIG. 1 and the position shown in FIG. 4.

Disposed about the rear and side edges (as used herein the terms "front", "rear" and "side" are used with respect to the direction in which the driver of the automobile faces) is a fence 52 that includes a plurality of generally vertical (when the grid shaped tray 26 is positioned for use) supports 54. The grid shaped tray 26 is supported by a pair of oblique laterally spaced struts 60 having respective eyes 62 disposed at the lower axial extremity thereof that encircles the cross member 18. More particularly, the eyes 62 extend in a direction that is away from the vertical legs 16. Thus, the struts 60 will fold most compactly with respect to the legs 16, because the struts 60 can move between the support position shown in FIG. 1 to the compact storage position shown in FIG. 4. First and second cross members 66, 68 extend laterally between the oblique laterally spaced struts 60 to ensure that the structure is adequately rigid.

The illustrated embodiments of the present invention is manufactured of plastic or plastic covered metal in preferred forms of the invention. In general, plastic embodiments will have somewhat larger physical structure to ensure adequate rigidity.

Figure 5:
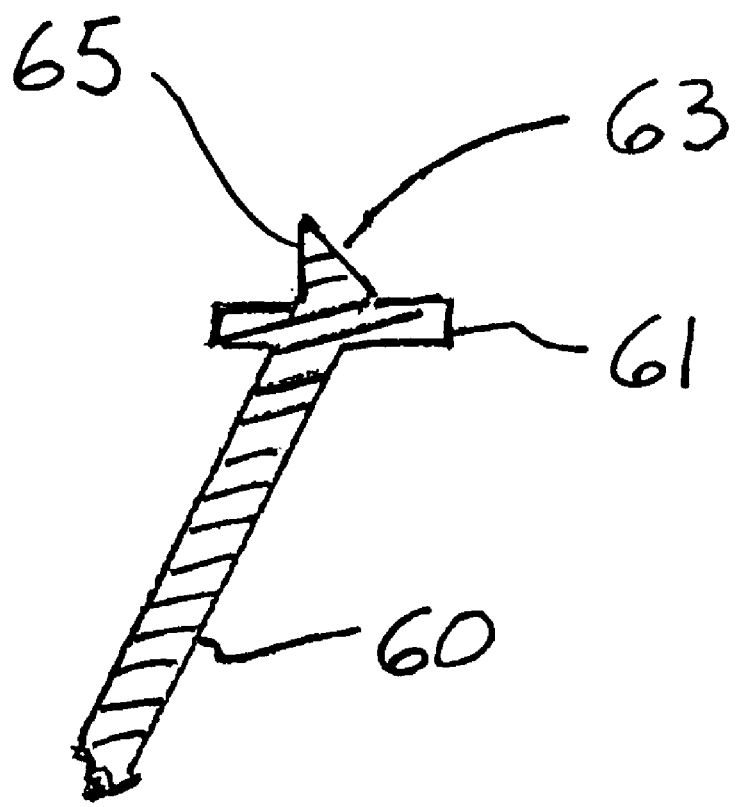
FIG. 5 is a fragmentary sectional view of the upper extremity of the oblique strut that supports the tray in one form of present invention.

In a preferred form of the invention the right (as viewed in FIG. 1) corners of the frame 28 include generally horizontal eyes 70, 72 that respectively slip fit over the upper (as viewed in FIG. 1) axial extremities of the respective struts 60. In a preferred form the invention the upper axial extremity of each of the struts 60 as the shown in FIG. 5, includes a shoulder; 61 for supporting one of the eyes 70, 72. The upper axial extremity of the struts 60, as seen in FIG. 5, includes a shoulder 61 on which the eye 70 or 72 rests in a generally horizontal position. The extreme upper axial extremity of each of the struts 60 is provided with a rounded contour 63. The rounded contour 63 is dimensioned and configured to allow easy movement and disengagement of the eye 70 or 72 if a forward force is applied to the frame 28, relative to the hinge 62. Such a forward force might be applied during a rapid vehicle deceleration, whereby the top of the front seat moves forward more quickly than the bottom, thereby pulling the eyes 70, 72 off the respective struts 60. Alternatively, such a forward force can arise if the occupant behind the apparatus is thrown forward. In other words, in the event of a sudden stop the weight of a passenger would move forward to impact the rear most part of the frame 28. With the rounded contour 63 the eyes 70, 72 will easily slip off the struts 60 and allow collapse of the apparatus. Conversely, the rounded contour 63 will firmly engage the respective eyes 70 or 72 to avoid inadvertent collapsed in response to heavy objects being placed on the grid shaped tray 26.

In the preferred embodiments their various elements are molded plastic and preferably most elements are cylindrical plastic sections having a diameter of approximately one-quarter of one inch. As used herein, the term "slip fit" means a physical connection that allows easy relative slipping movement and disengagement in response to a forward force in the direction of the associated first seat such as that described above.

While the preferred embodiment of the present invention has been shown and described, various modifications and substitutions may be made thereto without departing from the spirit and scope of the invention.

What is claimed is:

1. A tray assembly for mounting on the back of a first associated seat that is disposed substantially in front of a second associated seat to permit a user to sit on the second associated seat and utilize the tray assembly, comprising:

first and second inverted generally U-shaped hooks, each of said hooks having first and second legs, each of said first legs adapted to extend along a front face of the first associated seat and each of said second legs adapted to extend along the rear face of the seat back of said first associated seat;

first and second laterally spaced cross members extending between said second legs along the rear face of the associated first seat when said U-shaped hooks engage the back of said first associated seat;

a generally rectangular tray having one side hinged to said first cross member;

first and second oblique supports extending from spaced parts of a second side of said generally rectangular tray that is opposed to said one side, to said second cross member; and slip fit means coupling said oblique supports and said generally rectangular tray;

wherein said slip fit means includes substantially horizontally oriented eye shaped elements dimensioned and configured for slip fit engagement respectively with said first and second oblique supports.

2. The tray assembly in accordance with claim 1, wherein the upper axial extremity of each of said oblique supports includes a shoulder for vertically supporting one of said eye shaped elements.

3. The tray assembly in accordance with claim 2, wherein each of the oblique supports has an upper extremity that includes a rounded surface that is tapered downwardly toward the associated second seat to ensure release in response to a forward force in the direction of the associated first seat.

4. The tray assembly in accordance with claim 1, wherein each of said oblique supports includes a circular end dimensioned and configured to pivotally engage the second cross member.

5. The tray assembly in accordance with claim 4, wherein said circular end of each of said oblique supports is offset in a direction that is away from said second legs whereby the oblique support members will fold more compactly.

6. A tray assembly for mounting on the back of a first associated seat that is disposed substantially in front of a second associated seat to permit a user to sit on the second associated seat and utilize the tray assembly, comprising:

first and second inverted generally U-shaped hooks, each of said hooks having first and second legs, each of said first legs adapted to extend along a front face of the first associated seat and each of said second legs adapted to extend along the rear face of the seat back of said first associated seat;

a first rigid cross support extending transversely on said second legs along the rear face of the associated first seat when said U-shaped hooks engage the back of said first associated seat;

a generally rectangular tray having one side hinged to said first cross support;

first and second laterally spaced oblique supports, each having a hinged lower extremity supported by one of said second legs below said first cross support, and extending obliquely with an upper extremity to a second side of said tray opposite said one side;

slip fit means cooperating between the upper extremity of each oblique support and the second side of said tray, wherein in an engaged condition the oblique supports brace the tray in a horizontal orientation for said use and in a slipped condition the oblique supports are fully disengaged from the tray such that the oblique supports and the tray freely pivot independently of each other.

7. The tray assembly of claim 6, including a second rigid cross support extending transversely on said second legs below the first cross support, and wherein the lower extremities of the oblique support members are hinged to the second cross support.

8. The tray assembly of claim 7, wherein the tray is hinged to the first cross support at locations on the first cross support that are each a first distance from the second legs, and the lower extremities of the oblique supports are hinged to the second cross support at locations on the second cross support that are each a second distance from the second legs, said second distance being different from said first distance.

* * * * *